(12) United States Patent
Piippo et al.

(10) Patent No.: US 8,723,459 B2
(45) Date of Patent: May 13, 2014

(54) METHOD AND ARRANGEMENT FOR CONTROLLING PERMANENT MAGNET SYNCHRONOUS MACHINES

(75) Inventors: Antti Piippo, Espoo (FI); Jani Kangas, Espoo (FI); Jussi Rantanen, Espoo (FI)

(73) Assignee: ABB Oy, Helsinki (FI)

( * ) Notice: Subject to any disclaimer, the term of this patent is extended or adjusted under 35 U.S.C. 154(b) by 707 days.

(21) Appl. No.: 12/970,362

(22) Filed: Dec. 16, 2010

(65) Prior Publication Data

US 2011/0148334 A1    Jun. 23, 2011

(30) Foreign Application Priority Data

Dec. 18, 2009 (EP) ..................... 09179902

(51) Int. Cl.
*H02P 21/00* (2006.01)
(52) U.S. Cl.
USPC .................................... 318/400.02
(58) Field of Classification Search
None
See application file for complete search history.

(56) References Cited

U.S. PATENT DOCUMENTS

| 2005/0146306 | A1 | 7/2005 | Ha et al. |
| 2007/0063667 | A1 | 3/2007 | Nojima |
| 2008/0018291 | A1 | 1/2008 | Atarashi et al. |

FOREIGN PATENT DOCUMENTS

| EP | 1 492 224 A1 | 12/2004 |
| EP | 1 764 909 A2 | 3/2007 |
| JP | 2004-48886 | * 12/2004 |

OTHER PUBLICATIONS

Translation of JP2004-48886 is used in the office action.*
European Search Report for EP 09179902.3 dated Jul. 2, 2010.
F. Blaabjerg et al., "Very-Low-Speed Variable-Structure Control of Sensorless Induction Machine Drives Without Signal Injection", IEEE Transactions on Industry Applications, Mar./Apr. 2005, pp. 591-598, vol. 41, No. 2.

* cited by examiner

*Primary Examiner* — Shawki S Ismail
*Assistant Examiner* — Zoheb Imtiaz
(74) *Attorney, Agent, or Firm* — Buchanan Ingersoll & Rooney PC

(57) ABSTRACT

A method and an arrangement are provided for controlling a sensorless permanent magnet synchronous machine using a frequency converter connected to feed the machine with electrical power. A current vector having a magnitude is produced to the stator of the machine with the frequency converter, and the current vector is rotated for rotating the rotor of the machine. Prior to starting the drive, a value is defined for the magnitude of the current vector and a frequency limit. The defined value is used as the magnitude of the current vector when the rotor of the machine is rotated with a frequency that is lower than the defined frequency limit. A vector control method is used for controlling the machine when the frequency of the machine is higher than or equal to the defined frequency limit.

6 Claims, 1 Drawing Sheet

METHOD AND ARRANGEMENT FOR CONTROLLING PERMANENT MAGNET SYNCHRONOUS MACHINES

RELATED APPLICATION

This application claims priority under 35 U.S.C. §119 to European Patent Application No. 09179902.3 filed in Europe on Dec. 18, 2009, the entire content of which is hereby incorporated by reference in its entirety.

FIELD

The present disclosure relates to the control of permanent magnet synchronous machines. More particularly, the present disclosure relates to the control of permanent magnet synchronous machines using a frequency converter, without speed or position sensors.

BACKGROUND INFORMATION

It is known in the art of controlling permanent magnet synchronous machines (PMSM) that in order to start the machine reliably, the rotor position has to be known to some extent. If the position of the rotor is not known, the shaft of the motor may turn to the wrong direction or the shaft may begin to vibrate when starting the motor. Further, the starting of the motor may fail completely and the frequency converter may begin to magnetize a motor while it is in a stand-still state. In some processes or tools using the motor, the rotation of the shaft to the wrong direction may be detrimental to the process or the tool.

For reliably starting the PMSM, the rotor position has to be measured, estimated or forced to a known position before starting the motor. In simple and low-cost applications, the measurement of the rotor position is avoided due to the costs relating to measurement sensors and their maintenance.

Methods of estimating the rotor position are based on specific properties of the machine. These properties include the magnetic asymmetry of the rotor and magnetic saturation. The estimation methods are not generally suitable for different kinds of PMSMs due to differences in the above properties between different machines.

The position of the rotor can be simply forced to a specific position by applying a DC current to the stator of the machine. The forcing of the position is a simple and reliable way of ensuring the starting of the machine from a known rotor position. This procedure can be suitable in cases where the rotation of the rotor to the wrong direction cannot be allowed.

It is known to start the PMSM by feeding a current to the stator and increasing slowly the frequency of the current vector. This method of forced current vector rotation has to be taken from the use at higher speeds so to increase the performance of the drive. However, the method of forced current vector rotation is not suitable for all types of PMSMs and for all types of loads connected to the machine.

SUMMARY

An exemplary embodiment provides a method of controlling a sensorless permanent magnet synchronous machine using a frequency converter connected to feed the machine with electrical power. The exemplary method includes producing a current vector having a magnitude to a stator of the machine with the frequency converter, and rotating the current vector for rotating a rotor of the machine. The exemplary method also includes, prior to starting a drive of the machine, defining a value for the magnitude of the current vector and a frequency limit. The defined value is used as the magnitude of the current vector when the rotor of the machine is rotated with a frequency that is lower than the defined frequency limit. A vector control method is used for controlling the machine when the frequency of the machine is higher than or equal to the defined frequency limit.

An exemplary embodiment of the present disclosure provides an arrangement for controlling a sensorless permanent magnet synchronous machine using a frequency converter connected to feed the machine with electrical power. The exemplary arrangement includes means for producing a current vector having a magnitude to a stator of the machine with the frequency converter. The exemplary arrangement also includes means for rotating the current vector for rotating the rotor of the machine. The exemplary arrangement includes means for setting a value for the magnitude of the current vector and a frequency limit. In addition, the exemplary arrangement includes means for taking into use the defined value as the magnitude of the current vector when the rotor of the machine is rotated with a frequency that is lower than the defined frequency limit. The exemplary arrangement also includes means for taking into use a vector control method for controlling the machine when the frequency of the machine is higher than or equal to the defined frequency limit.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
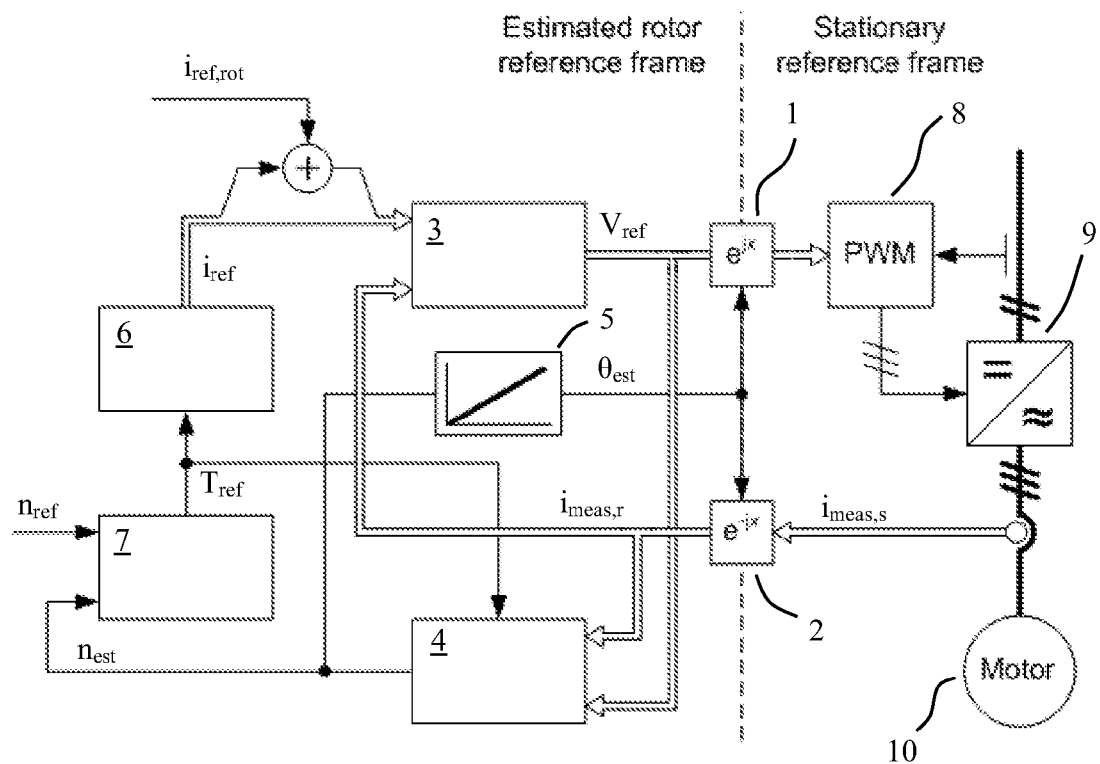
FIG. 1 is a block diagram of an exemplary embodiment of the present disclosure.

Exemplary embodiments of the present disclosure provide a method and an arrangement for controlling a sensorless PMSM using a frequency converter connected to feed the machine with electrical power.

Exemplary embodiments of the present are disclosure based on the idea of adapting the drive for different permanent magnet synchronous machines and for different loads. This adaptation to the load is carried out by providing parameters to the drive which are used for defining the magnitude of the current vector and the frequency limit under which the forced current vector rotation is used.

In accordance with exemplary embodiments of the present disclosure, the operation of the drive is adapted to the requirements of the PMSM and the load. The magnitude of the current vector used in forced current vector rotation has an effect on the initial starting of the drive. If the magnitude is higher than required, the motor and the load connected to the motor may turn in the wrong direction with a very high force, which may be detrimental to the mechanical structures of the drive. The magnitude of the current vector should, however, be so high that the motor generates enough torque for starting the rotation of the motor.

The provided frequency limit sets the frequency above which ordinary vector control is taken into use. An advantage of setting the frequency limit comes from the fact that different types of the PMSMs can be controlled reliably using vector control from lower frequency. Thus, the frequency limit above which a vector control method can reliably be used depends on the properties of the machine.

In accordance with an exemplary embodiment, a vector control method is used continuously regardless of the frequency of the machine. In this embodiment, the forced current vector rotation is taken out of use when the set frequency limit is exceeded. This procedure makes the transition between the different methods fluent when the frequency of the machine crosses the frequency limit. In this embodiment, the dynamic properties of the drive are also increased since the vector control used in low speeds makes the machine more responsive to changes of the load or changes of control signals.

DETAILED DESCRIPTION

In accordance with an exemplary embodiment of the present disclosure, a permanent magnet synchronous machine is controlled without a measured feedback signal from the rotational speed or angular position of the rotor. The type of control depends on the frequency or rotational speed of the machine.

In accordance with an exemplary embodiment, a value for the magnitude of the current vector is defined. This value is set as a parameter to the frequency converter which feeds power to the machine. The magnitude of the current vector may be given to the frequency converter as an absolute value, e.g., in amperes, as a percentage of the nominal current, or in any other way that is understandable to the operator of the converter.

Similarly, a frequency limit $f_{lim}$ is given to the frequency converter. In frequencies below the limit, the frequency converter feeds a current vector to the stator of the machine. The current vector has the magnitude defined by the user. The current vector is rotated according to the given reference, which can be a speed reference, for example.

According to an exemplary embodiment, the magnitude or length of the current vector defines how much torque the machine can produce. If the load has a large counter torque as compared to the nominal torque of the machine, the current can be selected to be substantially large. If, on the other hand, the counter torque or starting torque is small, the magnitude of the current vector can be selected to be smaller. When the current is selected to be smaller, the risk of turning the rotor in the wrong direction decreases. In accordance with an exemplary embodiment, when the current vector is rotated according to an embodiment, it catches the rotor and the rotor begins to rotate with the current vector. The rotation of the rotor is such that the d-axis of the rotor aligns with the current vector.

When the machine is started with the forced current vector rotation, the current vector is first fed to an arbitrary position with respect to the rotor. The angular position of the rotor is not known, and if the current at the starting situation has too high of a value, the rotor aligns instantly with the current vector, and may turn in either direction. If the length of the current vector is selected optimally or near optimally, the rotor does not make a heavy turn at the starting instant. The rotor may rotate slightly, but the movement is smoother than with the higher current. When the current vector is rotated, the produced magnetization of the stator catches the rotor and starts to rotate.

According to an exemplary embodiment, the frequency limit used in the arrangement and method defines the frequency above which the current vector forcing is not used and the control of the machine is carried out with an ordinary vector control method. When the frequency limit can be set by the operator of the frequency converter, the properties of the machine can be taken into account. It is known that the dynamic properties of the forced current vector rotation are poor when compared to those of vector control methods. Thus, it is advisable to set the frequency limit as low as possible so that the machine can be used in the most effective manner.

The size of the machine is one of the properties that have an effect on how low the frequency limit can be set. For example, high powered machines can have lower frequency limits, while smaller machines should have higher frequency limits. Values for the frequency limit can range from 2 to 10% of the rated frequency of the machine, for example.

According to an exemplary embodiment, the forced current vector rotation tracks the speed and position of the machine while under the frequency limit. When the frequency limit is reached and the control is changed to vector control, the speed and position determined during the forced current vector rotation are passed over to the control circuitry of the vector control. The change from one control scheme to another can be accomplished smoothly. Similarly, when the frequency drops below the limit, the change between the control schemes is carried out similarly. The rotor angle and rotational speed of the rotor are transferred from the active method to the activated method.

According to an exemplary embodiment, the vector control method is used throughout the entire speed range. Thus, the vector control method which is selected to be used is used even at the frequencies lower than the selected frequency limit. The forced current vector rotation on the other hand is taken out of use when the frequency limit is exceeded. According to this procedure, the dynamic properties of the drive are increased when operating at the frequencies under the frequency limit.

When the selected vector control method is operational even at low frequencies, both the vector control and forced current vector rotation schemes provide current references. These references are summed together and used in a normal manner in the vector control system. Thus, a rotating current reference is added to the current reference produced with the vector control scheme. The vector control scheme helps in providing faster responses during fast accelerations as will be described later on.

According to an exemplary embodiment, the rotor position estimate is corrected when the forced current vector is used. When the machine is driven with the forced current vector, the rotor is aligned with the current vector when the machines is not loaded. If the machine is loaded, it has to produce torque. This means that the current vector is no longer aligned with the magnetic axis of the rotor and a quadrature component $1_q$ is produced to the current. As a result, the position of the rotor is not longer the same as the position of the rotating current vector. When the control schemes are used simultaneously, the speed of the machine can be estimated using the estimation algorithm of the vector control method. In this case, the estimated orientation of the rotor can also be corrected.

FIG. 1 shows a block diagram of current vector control of a PMSM drive according to an exemplary embodiment of the present disclosure. FIG. 1 shows reference and feedback signals connected between functional blocks used in the vector control. Single lines denote scalar quantities, whereas double lines denote two-dimensional vector quantities. Vector quantities are defined in the stationary reference frame in the right hand side of the coordinate transformations 1, 2, and in the estimated rotor reference frame in the left hand side of the coordinate transformations 1, 2. The rotor reference frame is defined by attaching the permanent magnet flux linkage to the direct axis. The quadrature axis advances the direct axis by π/2 radians.

In the following, the speed sensorless vector control according to FIG. 1 is explained in more detail. The speed controller 7 receives speed reference $n_{ref}$, for example, from the user. The speed controller 7 provides a torque reference signal $T_{ref}$, which is used to determine the direct and quadrature axis components of the stator current reference in the torque controller 6. The current references $i_{ref}$ are fed to a current controller 3, which provides stator voltage reference signal $V_{ref}$. The stator voltage reference $V_{ref}$ is transformed from the estimated rotor reference frame to the stationary reference frame using transformation block 1. The voltage reference is further fed to the pulsewidth modulator (PWM) 8 that provides three-phase switch turn references to the inverter 9. The inverter 9 feeds the three-phase voltage to the permanent magnet synchronous motor 10.

The phase currents $i_{meas,s}$ of the motor are measured and transformed to the estimated rotor reference frame with block 2. The transformed current $i_{meas,r}$ outputted from block 2 serves as the feedback signal to the current controller 3. The voltage reference and the measured current are fed to the speed estimation block 4, which calculates the estimated speed $n_{est}$ based on a motor model. This estimated speed $n_{est}$ serves as a feedback to the speed controller 7. The estimated rotor position $\theta_{est}$ is calculated by integrating the estimated speed $n_{est}$ with integration block 5. This estimated position $\theta_{est}$ is used in the coordinate transformation blocks 1, 2. It is to be noted, that the example given is one of the possibilities for providing a vector control without the use of speed or position sensors.

Figure 2:
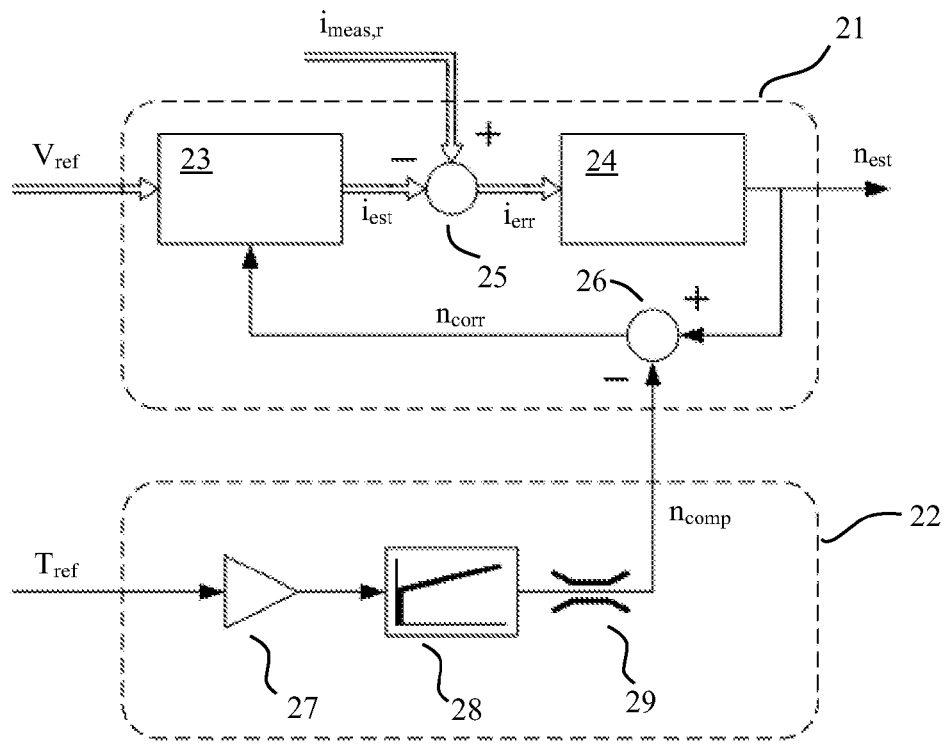
FIG. 2 is a block diagram of a speed estimation according to an exemplary embodiment of the present disclosure.

FIG. 2 shows the block diagram of an observer used for the speed estimation according to an exemplary embodiment of the present disclosure. FIG. 2 illustrates the contents of the speed estimation block 4 of FIG. 1. The conventional observer, located inside the upper dashed border 21 of FIG. 2, consists of a motor model 23 and a speed estimation block 24. In the conventional observer 21, voltage reference $V_{ref}$ and estimated speed $n_{est}$ are fed to the motor model 23, which calculates an estimate for the stator current $i_{est}$. In summation element 25, the estimated stator current is subtracted from the measured stator current $i_{meas,r}$. The speed estimate is changed until the estimated and measured currents have the same value at which situation the speed estimate is considered to reflect the actual speed of the machine.

In accordance with an exemplary embodiment, the observer 21 is augmented with forcing of the orientation by subtracting a position compensation term $n_{comp}$ from the estimated speed that is fed back to the motor model 23. The position compensation term is obtained from the dashed block 22, which receives, at its input, a torque reference $T_{ref}$. The torque reference $T_{ref}$ is amplified with gain block 27 and further fed to a controller block 28, which is presented in FIG. 2 as a PI controller. The output of the controller 28 is further fed to a limitation element 29 which acts to limit the value from the controller block 28 in response to the frequency of the drive. The output $n_{comp}$ of block 22 is fed to the speed estimation loop as described above. Although the controller 28 is presented in FIG. 2 as a PI controller, it may be implemented as an I controller, for example.

When the position compensation term $n_{comp}$ is subtracted from the estimated speed, the motor model 23 is forced to make a current estimate that is not correct. Thus, the current error $i_{err}$ is forced to have a value that is higher than without the position compensation. This further makes the result of speed adaptation block have higher values than the real speed of the machine leading to corrected rotor position. The orientation is thus forced through the conventional speed estimation method of the vector control.

The forced current vector is generated by summing a reference value iref,rot to current reference outputted by the torque controller 6 in FIG. 1. As the torque controller 6 operates in the estimated rotor reference frame, the rotating current vector is a DC signal that can be injected to the direct axis current reference. Thus, the current vector lies in the d-axis. The DC current signal in the estimated rotor reference becomes rotating AC current in the stationary reference frame.

According to an exemplary embodiment, the magnitude of the iref,rot can be defined by the user. In the position compensation, a torque reference is used. Once torque is needed from the machine, the orientation of the stator current vector changes from the d-axis as explained above. Thus, the torque reference can be used as an input to the compensation structure. However, the input to the orientation correction block 22 may be some other signal proportional to torque, such as quadrature component of stator current or its reference, for example.

When the frequency of the machine reaches the defined frequency limit, the speed compensation term is limited with the limitation element 29 and finally removed, and the injected rotating current reference is taken away. Since the conventional vector control is operational and provides constantly current references, the operation is continued smoothly. Similarly, as the speed or frequency of the drive decreases below the limit frequency, the speed compensation term is taken into use gradually.

In the low speed region, i.e. below the limit frequency, the vector control gives good dynamical properties to the drive. The torque controller 6 of the vector control changes the current references such that in dynamic changes the current references take part in the formation of voltage references although the rotating current vector might have quite a high value. For example, if fast acceleration is requested, the torque controller 6 forces the q-component of the stator current to increase while the value of the d-component is mainly set by the magnitude of the rotating current vector.

The above described exemplary embodiments can be implemented in an arrangement, in which means are provided with which the parameters relating to frequency and amplitude of the current can be fed to a frequency converter. This may be a control panel in connection with the converter or these parameters can also be fed from a higher control system when the arrangement is connected to a larger system.

Exemplary embodiments of the present disclosure also provide a method taking into use the defined values. These means are preferably a processor (e.g., a computer processor executing a computer program recorded on a non-tangible computer-readable recording medium, such as a non-volatile memory) that reads the set parameters and incorporates these parameters in the control system. The method for taking into use a vector control can be implemented by a processor that calculates or obtains the frequency of the drive so that the type of control can change when the frequency changes. It is understandable that frequency converters contain processors and readable memory so that the method can be implemented in an arrangement in connection with a frequency converter.

A frequency converter that implements vector control can be modified for implementing the exemplary embodiments of the present disclosure. As seen from FIGS. 1 and 2, additional calculations and modification to the conventional vector control are quite minimal. The conventional vector control can be implemented using a computer processor executing software code (e.g., a computer program), and the features of the embodiments can be implemented similarly.

It will be appreciated by a person skilled in the art that, as the technology advances, the inventive concept of the present disclosure can be implemented in various ways. The present disclosure and its embodiments are not limited to the examples described above but may vary within the scope of the claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of controlling a sensorless permanent magnet synchronous machine using a frequency converter connected to feed the machine with electrical power, the method comprising:
producing a current vector having a magnitude to a stator of the machine with the frequency converter; and
rotating the current vector for rotating a rotor of the machine,
wherein the method further comprises:
prior to starting a drive of the machine, defining a value for the magnitude of the current vector and a frequency limit;
using the defined value as the magnitude of the current vector when the rotor of the machine is rotated with a frequency that is lower than the defined frequency limit; and
using a vector control method for controlling the machine when the frequency of the machine is higher than or equal, or below to the defined frequency limit, wherein the vector control method includes:
providing a signal proportional to a torque of the machine;
amplifying the signal proportional to the torque and feeding the amplified signal to a controller for obtaining a speed compensation term;
subtracting the speed compensation term from an estimated speed obtained from a vector control algorithm for obtaining a corrected speed estimate;
using the corrected speed estimate in a motor model for obtaining a stator current estimate;
calculating a stator current error as a difference between a measured stator current and the estimated stator current; and
estimating a speed of the machine from the stator current error for correcting an orientation of an estimate of a rotor angular position.

2. A method according to claim 1, comprising:
using the vector control method in the frequencies below the defined frequency limit.

3. A method according to claim 2, comprising:
producing a current reference for the rotating current vector;
producing current references with the vector control method;
summing the current reference for the rotating current vector to the current references obtained with the vector control; and
controlling the machine with the summed current reference.

4. A method according to claim 3, comprising:
stopping the summing of the current references when the frequency of the machine exceeds the defined frequency limit.

5. A method according to claim 1, comprising:
limiting the value of the speed compensation term when the frequency of the machine exceeds the defined frequency limit.

6. An arrangement for controlling a sensorless permanent magnet synchronous machine using a frequency converter connected to feed the machine with electrical power, the arrangement comprising:
means for producing a current vector having a magnitude to a stator of the machine with the frequency converter;
means for rotating the current vector for rotating a rotor of the machine;
means for setting a value for the magnitude of the current vector and a frequency limit;
means for taking into use the defined value as the magnitude of the current vector when the rotor of the machine is rotated with a frequency that is lower than the defined frequency limit; and
means for taking into use a vector control method for controlling the machine when the frequency of the machine is higher than or equal, or below to the defined frequency limit, wherein the means for taking into use the vector control method include:
means for providing a signal proportional to a torque of the machine;
means for amplifying the signal proportional to the torque and feeding the amplified signal to a controller for obtaining a speed compensation term;
means for subtracting the speed compensation term from an estimated speed obtained from a vector control algorithm for obtaining a corrected speed estimate;
means for using the corrected speed estimate in a motor model for obtaining a stator current estimate;
means for calculating a stator current error as a difference between a measured stator current and the estimated stator current; and
means for estimating a speed of the machine from the stator current error for correcting an orientation of an estimate of a rotor angular position.

* * * * *